US012731041B2

(12) United States Patent
Jati et al.

(10) Patent No.: US 12,731,041 B2
(45) Date of Patent: Sep. 8, 2026

(54) DISTRIBUTED TRAINING PROCESS WITH BOTTOM-UP ERROR AGGREGATION

(71) Applicant: International Business Machines Corporation, Armonk, NY (US)

(72) Inventors: Arindam Jati, Bangalore (IN); Vijay Ekambaram, Chennai (IN); Sumanta Mukherjee, Bangalore (IN); Brian Leo Quanz, Yorktown Heights, NY (US); Pavithra Harsha, White Plains, NY (US)

(73) Assignee: International Business Machines Corporation, Armonk, NY (US)

(*) Notice: Subject to any disclaimer, the term of this patent is extended or adjusted under 35 U.S.C. 154(b) by 978 days.

(21) Appl. No.: 17/953,372

(22) Filed: Sep. 27, 2022

(65) Prior Publication Data

US 2024/0104396 A1 Mar. 28, 2024

(51) Int. Cl.
*G06N 5/02* (2023.01)

(52) U.S. Cl.
CPC .................................... *G06N 5/02* (2013.01)

(58) Field of Classification Search
CPC ........................................................ G06N 5/02
See application file for complete search history.

(56) References Cited

U.S. PATENT DOCUMENTS

2016/0328432 A1* 11/2016 Raghunathan ...... G06F 16/2264
2022/0129747 A1 4/2022 Cetintas et al.
2022/0180274 A1 6/2022 Makhija et al.
2022/0318711 A1* 10/2022 Recasens ......... G06Q 10/06315
2022/0383145 A1* 12/2022 Sen ........................ G06N 3/045

OTHER PUBLICATIONS

Mancuso, Paolo, Veronica Piccialli, and Antonio M. Sudoso. "A machine learning approach for forecasting hierarchical time series." Expert Systems with Applications 182 (2021): 115102. (Year: 2021).*

Mircetic, Dejan, et al. "Forecasting hierarchical time series in supply chains: an empirical investigation." International Journal of Production Research 60.8 (2022): 2514-2533. (Year: 2022).*

(Continued)

*Primary Examiner* — Kevin W Figueroa
(74) *Attorney, Agent, or Firm* — Harrity & Harrity, LLP

(57) ABSTRACT

An example operation may include one or more of storing a hierarchical data set, receiving a plurality of predicted outputs from a plurality of nodes in a distributed computing environment, respectively, wherein each predicted output is generated by a different node via execution of a time-series forecasting model on a different subset of lowest level data in the hierarchical data set, combining the plurality of predicted outputs via bottom-up aggregation to generate one or more additional predicted outputs for the time-series forecasting model based on one or more levels above the lowest level in the hierarchical time-series data set, determining error values for the time-series forecasting model at each level of the hierarchical data set based on the received and the one or more additional generated predicted outputs, and modifying a parameter of the time-series forecasting model based on the determined error values.

20 Claims, 14 Drawing Sheets

100

100
COMPUTER 101
PROCESSOR SET 110
PROCESSING CIRCUITRY 120
CACHE 121
COMMUNICATION FABRIC 111
VOLATILE MEMORY 112
PERSISTENT STORAGE 113
OPERATING SYSTEM 122
Distributed Training with Bottom-up Aggregation
200
PERIPHERAL DEVICE SET 114
UI DEVICE SET 123
STORAGE 124
IoT SENSOR SET 125
NETWORK MODULE 115
END USER DEVICE 103
REMOTE SERVER 104
REMOTE DATABASE 130
WAN 102
PRIVATE CLOUD 106
GATEWAY 140
PUBLIC CLOUD 105
CLOUD ORCHESTRATION MODULE 141
HOST PHYSICAL MACHINE SET 142
VIRTUAL MACHINE SET 143
CONTAINER SET 144

150

(56) References Cited

OTHER PUBLICATIONS

Anderer, M., & Li, F. (2021). Forecasting reconciliation with a top-down alignment of independent level forecasts. arXiv preprint arXiv:2103.08250.
Bandara et al., Sales Demand Forecast in E-commerce using a Long Short-Term Memory Neural Network Methodology, Published in ICONIP 2019 Neural Information Processing, Aug. 2019.
Hyndman, R.J., & Athanasopoulos, G. (2018) Forecasting: principles and practice, 2nd edition, Online Text Book; OTexts: Melbourne, Australia. OTexts.com/fpp2. https://otexts.com/fpp2/.
Karmy et al., Hierarchical time series forecasting via Support Vector Regression in the European Travel Retail Industry, Published in Expert Systems with Applications, vol. 137, Dec. 2019.
Oliveira et al., Assessing the Performance of Hierarchical Forecasting Methods on the Retail Sector, Published in Entropy 21, Apr. 24, 2019.
Rangapuram, S. S., Werner, L. D., Benidis, K., Mercado, P., Gasthaus, J., & Januschowski, T. (Jul. 2021). End-to-end learning of coherent probabilistic forecasts for hierarchical time series. In International Conference on Machine Learning (pp. 8832-8843). PMLR.
Makridakis et al. "The M5 accuracy competition: Results, findings and conclusions", International Journal of Forecasting, Oct. 2020, 45 pages.
Makridakis et al. "The M5 competition: Background, organization, and implementation", International Journal of Forecasting, Sep. 2021, 23 pages, vol. 38, Issue No. 3.
Xu et al. "A Review of Croston's method for intermittent demand forecasting", 9th International Conference on Fuzzy Systems and Knowledge Discovery, May 2012, pp. 1456-1460.

* cited by examiner

Figure 4A:
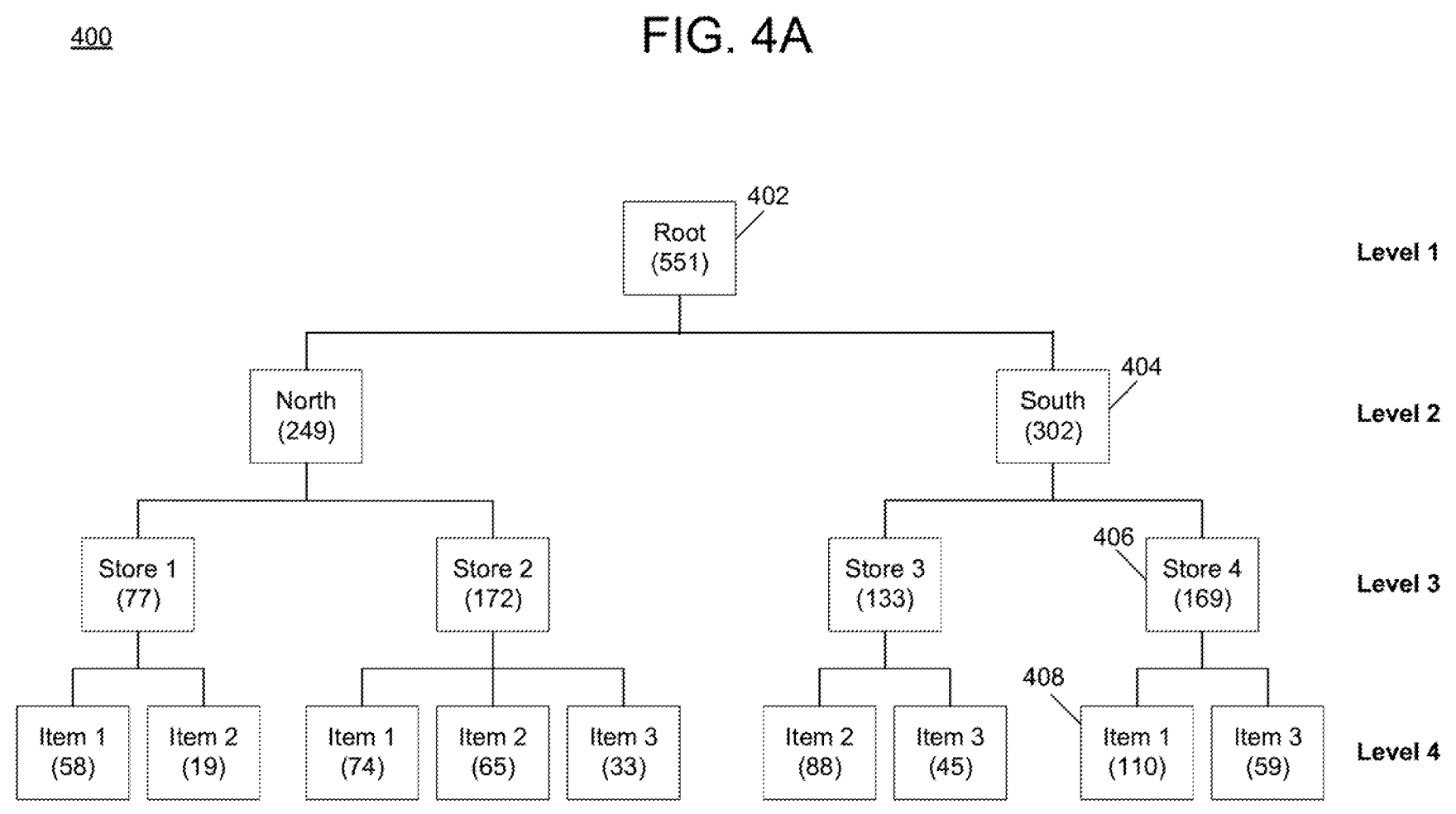

Level 1
Level 2
Level 3
Level 4

402
Root (551)

404
South (302)

North (249)

406
Store 4 (169)

Store 3 (133)

Store 2 (172)

Store 1 (77)

408
Item 1 (110)

Item 3 (59)

Item 2 (88)

Item 3 (45)

Item 1 (74)

Item 2 (65)

Item 3 (33)

Item 1 (58)

Item 2 (19)

430

600

DISTRIBUTED TRAINING PROCESS WITH BOTTOM-UP ERROR AGGREGATION

BACKGROUND

Time-series forecasting is a process in which a machine learning model predicts a future observation (e.g., a forecasted data value or distribution of data values) likely to occur in the future based on historical time-stamped data. Various types of machine learning algorithms including regression, random forests, neural networks, support vector machines, and the like, can be used as time-series forecasting models and applied to time-series data. A traditional model training process for a time-series forecasting model is referred to as a "hold-out" method in which the training data is split into different data sets including a first data set for training and a second data set for validating the trained model. During the testing phase, the user may manually make changes to the time-series forecasting model to optimize parameters.

However, the traditional training process for a time-series forecasting model relies on the lowest level of time-series data from a hierarchical data set. The lowest-level time-series data is typically the most sporadic/sparse which again leads to a model that is not as accurate (makes poor predictions, etc.). In many cases, the lowest level of the time-series data is intermittent with zero values mixed in with non-zero values. The zero values can reduce the accuracy of the trained model. For example, the model may struggle to capture trends and seasonality patterns within the data due to the intermittent data.

SUMMARY

One example embodiment provides an apparatus that includes a memory configured to store a hierarchical time-series data set, and a processor configured to one or more of receive a plurality of predicted outputs from a plurality of nodes in a distributed computing environment, respectively, wherein each predicted output is generated by a different node via execution of a time-series forecasting model on a different subset of data from a lowest level in the hierarchical time-series data set, combine the plurality of predicted outputs via bottom-up aggregation to generate one or more additional predicted outputs for the time-series forecasting model based on one or more levels above the lowest level in the hierarchical time-series data set, determine error values for the time-series forecasting model at each level among multiple levels of the hierarchical time-series data set based on the received plurality of predictive output and the one or more additional generated predicted outputs, and modify a parameter of the time-series forecasting model based on the determined error values.

Another example embodiment provides a method that includes one or more of storing a hierarchical time-series data set, receiving a plurality of predicted outputs from a plurality of nodes in a distributed computing environment, respectively, wherein each predicted output is generated by a different node via execution of a time-series forecasting model on a different subset of data from a lowest level in the hierarchical time-series data set, combining the plurality of predicted outputs via bottom-up aggregation to generate one or more additional predicted outputs for the time-series forecasting model based on one or more levels above the lowest level in the hierarchical time-series data set, determining error values for the time-series forecasting model at each level among multiple levels of the hierarchical time-series data set based on the received plurality of predictive output and the one or more additional generated predicted outputs, and modifying a parameter of the time-series forecasting model based on the determined error values.

A further example embodiment provides a computer-readable medium comprising instructions, that when read by a processor, cause the processor to perform one or more of storing a hierarchical time-series data set, receiving a plurality of predicted outputs from a plurality of nodes in a distributed computing environment, respectively, wherein each predicted output is generated by a different node via execution of a time-series forecasting model on a different subset of data from a lowest level in the hierarchical time-series data set, combining the plurality of predicted outputs via bottom-up aggregation to generate one or more additional predicted outputs for the time-series forecasting model based on one or more levels above the lowest level in the hierarchical time-series data set, determining error values for the time-series forecasting model at each level among multiple levels of the hierarchical time-series data set based on the received plurality of predictive output and the one or more additional generated predicted outputs, and modifying a parameter of the time-series forecasting model based on the determined error values.

BRIEF DESCRIPTION OF THE DRAWINGS

Figure 1A:
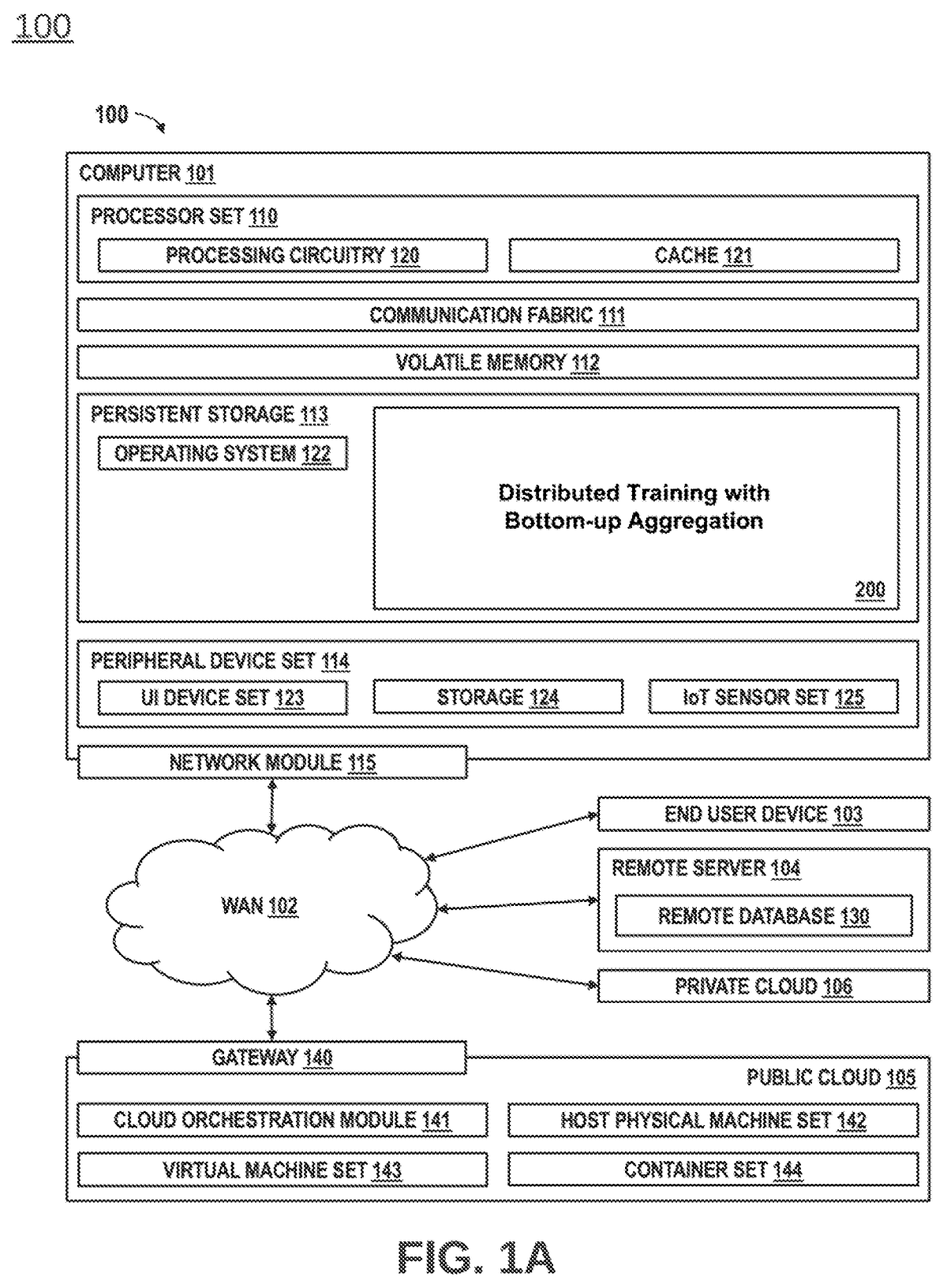

FIG. 1A is a diagram illustrating a cloud computing environment according to an example embodiment.

FIG. 4A is a diagram illustrating a hierarchical time-series data set including a plurality of levels of data according to example embodiments.

DETAILED DESCRIPTION

Figure 1B:
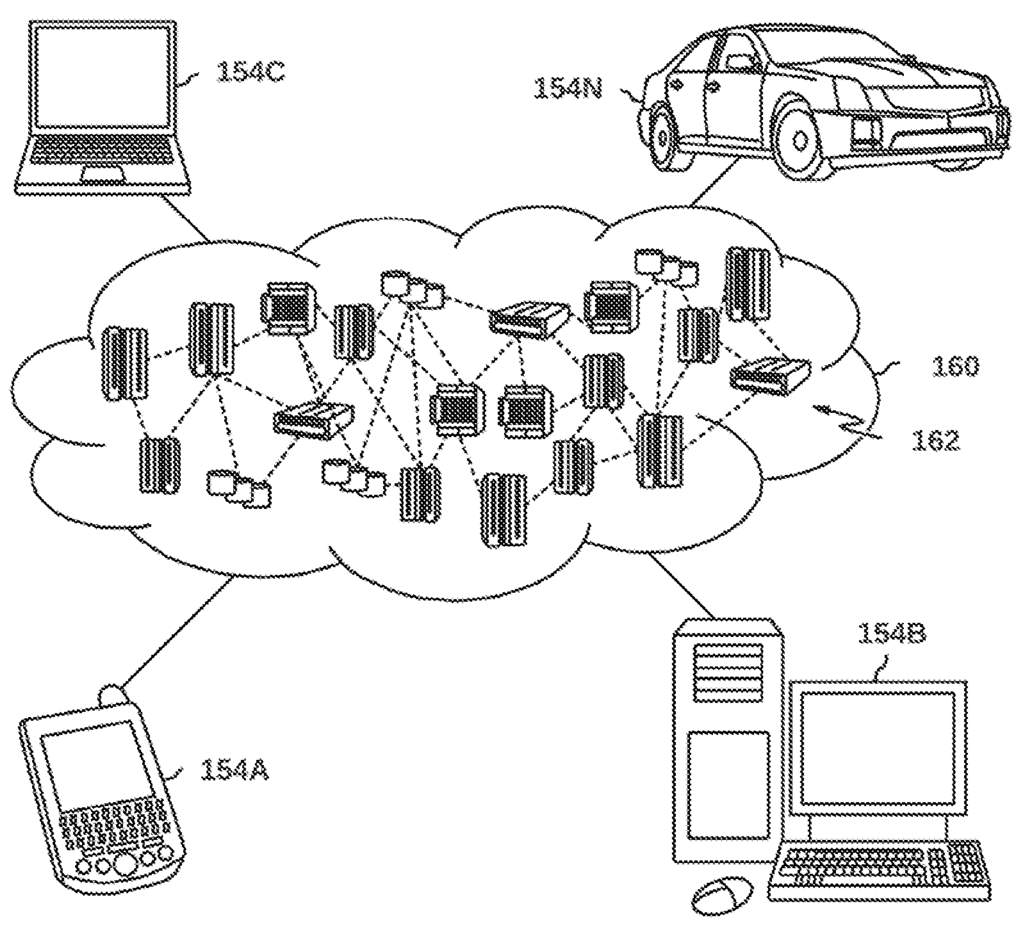
FIG. 1B is a diagram illustrating a cloud computing environment according to another example embodiment.

It is to be understood that although this disclosure includes a detailed description of cloud computing, implementation of the teachings recited herein is not limited to a cloud computing environment. Rather, embodiments of the present invention are capable of being implemented in conjunction with any other type of computing environment now known or later developed.

As referred to herein, a time-series forecasting model may be a machine learning model such as a regression model, a neural network, a support vector machine, and the like. The model may be trained to predict future observations for time-series data based on historical values of the time-series data set.

Traditionally, time-series forecasting models that are trained only on lowest-level time-series data suffer from performance problems due to lack of accuracy. One of the causes of this inaccuracy is the sparseness of the data at the lowest-level of the data set. The sparseness of the data makes it difficult for the model to detect attributes within the data such as a trend component and a seasonality component.

The example embodiments are directed to a model training environment, such as a cloud platform, web server, or other host, which may train and host time-series forecasting models based on a bottom-up aggregation and error calculation that ensures that the trained model is adjusted based on predicted outputs from upper layers of the hierarchical time-series data set. According to various embodiments, the model may be trained within a distributed computing environment in which multiple processing nodes train the same time-series forecasting model on different subsets of training data. Each of the nodes may train the model using different subsets of lowest-level time-series data. The outputs created by the training nodes may be collected by an aggregator/host node that uses the predicted outputs to generate predicted outputs for upper layers of the time-series data set using a bottom-up aggregation. Furthermore, the aggregator node may determine the error of the model at each level and use the determined errors at each level to tune/adjust parameters of the time-series forecasting model including a trend component, a cyclical component, a seasonality component, a residual component, or the like.

In the example embodiments, the training data refers to time-series data having hierarchical attributes. In such a time-series data set, the lowest-level time series data represents the most sparse and sporadic reading/measuring of the data. For example, in a hierarchical time-series data set that includes sales/month by a company, the lowest-level of the hierarchical time-series sales data may be sales volume by person/employee. Meanwhile, a next-lowest level of the hierarchical time-series sales data set may include sales volume by store location. In this next-lowest level, a time-series data point (store level) is generated by aggregating together multiple time-series data points (multiple people from the person level) from the hierarchical time-series data set to create a single time-series data point in the next-lowest level of the time-series data. The hierarchies may continue upward with a state-level sales in which a time-series data point is created by aggregating multiple time-series data points from the store-level. A next level in the hierarchy may include East Coast and West Coast, which may include time-series data points. The root of the hierarchical time-series data set may include a single value that is created by aggregating the time-series values from the next-level below.

Some of the benefits of the example embodiments include improved model accuracy in the finally trained model. The process of updating the model based on the bottom-up aggregation and error calculation can be performed on an iterative basis (e.g., each step of the training process) thereby enhancing each iteration of the training. This can result in a faster training process as well as a more accurate model at the end of the training process.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Examples of cloud computing characteristics that may be associated with the example embodiments include the following.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Examples of service models that may be associated with the example embodiments include the following:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Examples of deployment models that may be associated with the example embodiments include the following:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Referring now to FIG. 1A, a computing environment 100 is depicted. Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again, depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for executing at least some of the computer code involved in performing the inventive methods, such as distributed training using bottom-up aggregation as shown in block 200. In addition to block 200, computing environment 100 includes, for example, computer 101, wide area network (WAN) 102, end-user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smartphone, smartwatch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, the performance of a computer-implemented method may be distributed among multiple computers and/or between multiple locations. On the other hand, in this presentation of the computing environment 100, a detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is a memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off-chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication Fabric 111 is the signal conduction paths that allow the various components of computer 101 to communicate with each other. Typically, this fabric comprises switches and electrically conductive paths, such as the switches and electrically conductive paths that make up busses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smartwatches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, this data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanations of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as communicating with WAN 102, in other embodiments, a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both parts of a larger hybrid cloud.

Referring now to FIG. 1B, an illustrative cloud environment 150 is depicted. As shown, cloud computing environment 160 includes one or more cloud computing nodes 162 with which local computing devices used by cloud consumers, such as, for example, personal digital assistant (PDA) or cellular telephone 154A, desktop computer 154B, laptop computer 154C, and/or automobile computer system 154N may communicate. Nodes 162 may communicate with one another. They may be grouped (not shown) physically or virtually in one or more networks, such as Private, Community, Public, or Hybrid clouds as described hereinabove, or a combination thereof. This allows cloud computing environment 160 to offer infrastructure, platforms and/or software as services for which a cloud consumer does not need to maintain resources on a local computing device. It is understood that the types of computing devices 154A-N shown in FIG. 1B are intended to be illustrative only and that computing nodes 162 and cloud computing environment 160 can communicate with any type of computerized device over any type of network and/or network addressable connection (e.g., using a web browser).

Figure 2A:
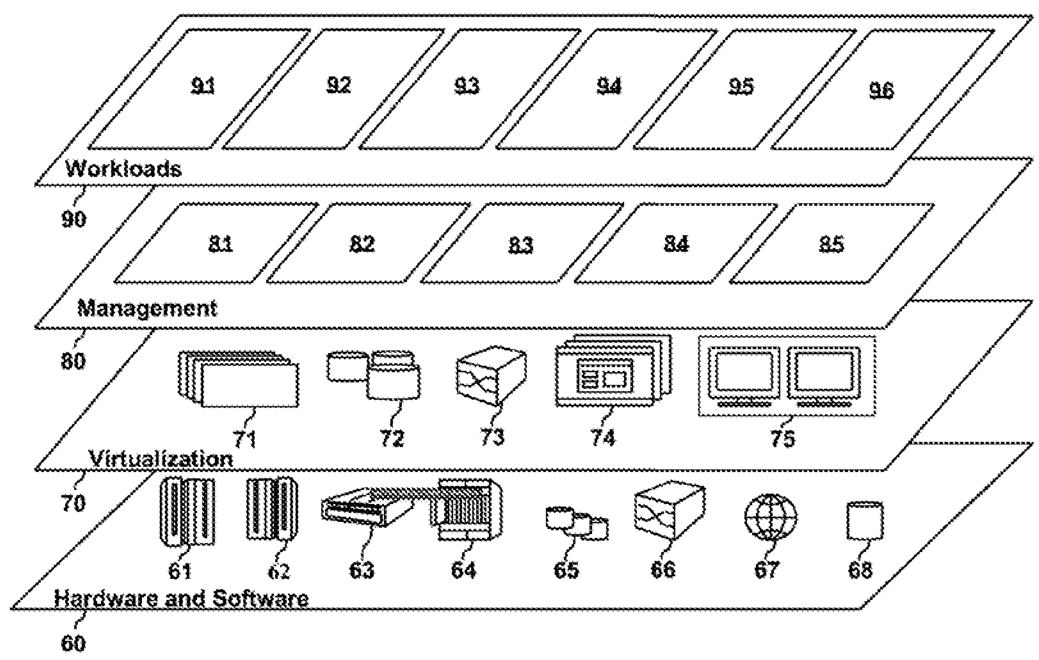
FIG. 2A is a diagram illustrating abstraction model layers of a cloud computing environment according to an example embodiment.

Referring now to FIG. 2A, a set of functional abstraction layers provided by cloud computing environment 50 FIG. 1) is shown. It should be understood in advance that the components, layers, and functions shown in FIG. 2A are intended to be illustrative only and embodiments of the invention are not limited thereto. As depicted, the following layers and corresponding functions are provided: Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workload layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and distributing model training processing 96.

Figure 2B:
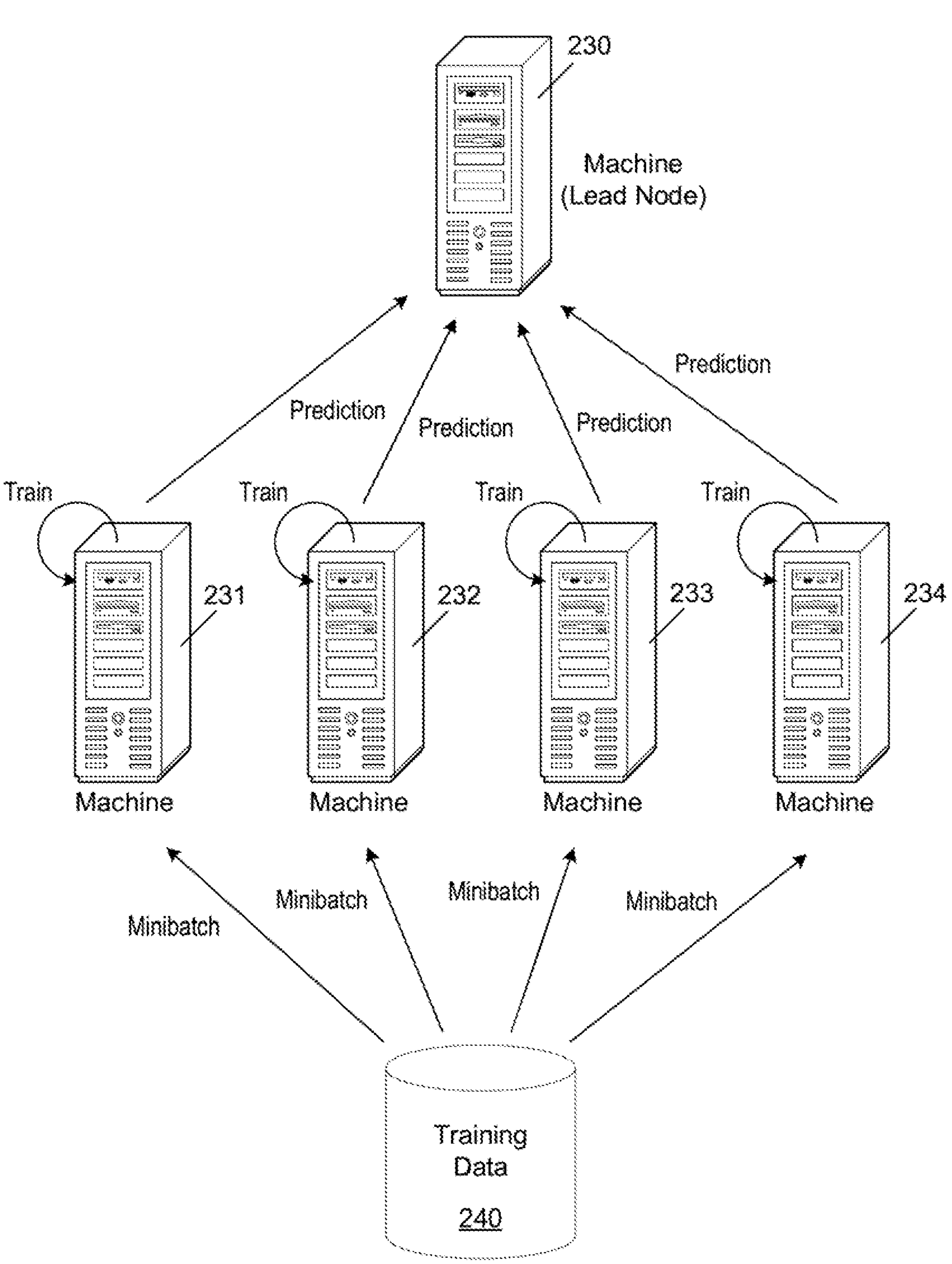
FIG. 2B is a diagram illustrating a process of training of a time-series forecasting model in a distributed environment according to an example embodiment.

FIG. 2B illustrates a process 220 of training of a time-series forecasting model in a distributed environment according to an example embodiment. For example, the process 220 may be performed by the distributed model training processing 96 shown in FIG. 2A.

In a centralized training environment (i.e., not distributed) the time-series forecasting model (e.g., neural networks, etc.) are trained using minibatches. A minibatch represents only a tiny fraction of the training data set (hierarchical time-series data set). Because of this, a minibatch may not represent the true distribution of the time-series data. To address this lack of distribution, a bottom-up aggregation process can be performed to aggregate predicted outputs based on the lowest-level of the time-series data to generate predicted outputs for one or more layers above the lowest-level in the time-series data set, also referred to herein as one or more upper-levels of the hierarchical time-series data set.

Referring to FIG. 2B, a host platform includes a plurality of computing nodes 230, 231, 232, 233, and 234 which can simultaneously train a time-series forecasting model in parallel together using training data which is retrieved from one or more data stores such as training data database 240. In this example, one of the nodes (i.e., lead node 230) is assigned a lead role or primary role amongst the plurality of computing nodes 230-234 while the other nodes 231, 232, 233, and 234 are processing nodes waiting for instructions from the lead node 230. As an example, the lead node 230 could be a control node of a distributed cluster environment such as a Kubernetes cluster. The role that each node performs may be changed at any time based on performance or any other reason. In this example, the lead node 230 may distribute training data (i.e., minibatches) to the computing nodes 231, 232, 233, and 234. Here, the training data may be randomly sampled by the lead node 230 from a hierarchical time-series data set stored within the training data database 240. Each computing node from among the computing nodes 231, 232, 233, and 234 may receive a different subset of training data from the lead node 230.

The computing nodes 231, 232, 233, and 234 may simultaneously train/execute a time-series forecasting model based on the different subsets of training data. Here, the computing nodes 231, 232, 233, and 234 may simultaneously train the same time-series forecasting model in parallel based on the different subsets of training data from the training data database 240. Furthermore, the results from the training may be sent to the lead node 230 which collects the predicted outputs (training results) and generates a bottom-up aggregation of the predicted outputs for one or more upper levels of the time-series data set. Next, the lead node 230 may determine an error value or values of the time-series forecasting model at each of the different levels based on the predicted outputs from the lowest-level and the aggregated predicted outputs for the one or more upper levels. The error values may then be combined/aggregated and used by the lead node to automatically tune one or more parameters of the time-series forecasting mode. The tuned parameters updated by the lead node 230 can be distributed to the other computing nodes 231, 232, 233, and 234 to ensure that each of the other nodes has the updated version of the model during a next iteration of the training process (which may include hundreds, thousands, or even more, rounds of training).

As an example, the error calculation may be a hierarchical aggregation of the error calculated for the time-series forecasting model at each level of the time-series data. In this example, the lead node 230 may calculate a root mean squared scaled error (RMSSE) for each level of the hierarchical time-series data set using a predefined algorithm. Then, the RMSSE may be aggregated together such that each level has the same weight in the total error value. As another option, a user may use a user interface to change the weights such that one or more of the levels are given more weight in the error calculation and tuning process.

According to various embodiments, a time-series forecasting model can be trained based on a bottom-up aggregation of predicted outputs from the lowest level of the hierarchical time-series data which generates aggregated predicted outputs for one or more upper levels of the hierarchical time series data. The forecasting error at the bottom-most level can be calculated and fed back to model update. Furthermore, the forecasts at the bottom-most level can be aggregated to find forecasts at any upper level and the forecasting error at that upper level can now be calculated, and fed back for model update.

Bottom-up aggregated time-series data at a particular node within a hierarchical time-series data set at a particular upper level is obtained by summing the time-series values of its children nodes at each time-point. The ground truth data is "coherent", i.e., the data at any higher-level node is the exact sum of the data of its children. The forecasts are desirable to be coherent as well since it helps making consistent decisions across different parts of an organization (for example, in the retail domain).

In the example embodiments, the system can ensure that forecasts are coherent since those are obtained by bottom-up aggregation of the lowest-level forecasts. The model is trained on the lowest-level data, but its forecasts are aggregated to any desired upper level and compared with the ground truth at any desired upper level to calculate the loss. Furthermore, the error is essentially training loss which is calculated and used to update the model to control the accuracy of the forecasts at higher levels. The loss takes the forecasts of the lowest level model as input, and aggregate them bottom-up to compute the loss at all levels.

The training process described herein enforces optimizing a hierarchically aggregated objective (made feasible by the distributed training framework). This process helps achieve better forecasting accuracy across all levels of the hierarchical time-series data. Better accuracy across all levels of the hierarchy is achieved by optimizing the hierarchically aggregated loss. However, this is not trivial because neural networks/time-series forecasting models are trained in minibatches and one minibatch with not be enough to do a bottom-up aggregation to obtain a forecast at a higher level (it might not cover all children of a node). Hence, the example embodiments also provide a distributed computing environment which distributes minibatches to multiple processing nodes in parallel for simultaneous execution. Furthermore, in some embodiments, the lead node may identify a target upper level at which to stop the bottom up aggregation and it may be below the root node in the hierarchical time-series data set. For example, the lead node may select an upper level based on a size of the training data, a number of processing cores, a desired amount of accuracy, and the like.

While distributed processing has been applied to other areas of technology, it has not been applied in the way it is here. In particular, distributed "training" of a time-series forecasting model is used to solve data coverage issues that can arise within different levels/hierarchies of a time-series data set. The example embodiments may optimize the hierarchically aggregated loss. Existing methods do not optimize the hierarchically aggregated loss, because minibatch training of neural nets would make it non-trivial and challenging. Meanwhile, in the example embodiments, distributed training is employed and maximum data coverage (full data) can be achieved in a resource-unconstrained scenario. Moreover, in a resource-constrained scenario, the system/lead node can identify a "reference hierarchical level". Given the resource constrained scenario, the system may stop aggregation one or two levels above the lowest level. The reference level can be automatically determined from the GPU resources and memory requirement for training a single minibatch.

FIGS. 3A-3E provide various examples of additional features that may be used in association with the cloud computing environment described herein. These examples should be considered as additional extensions or additional examples of the embodiments described herein.

Figure 3A:
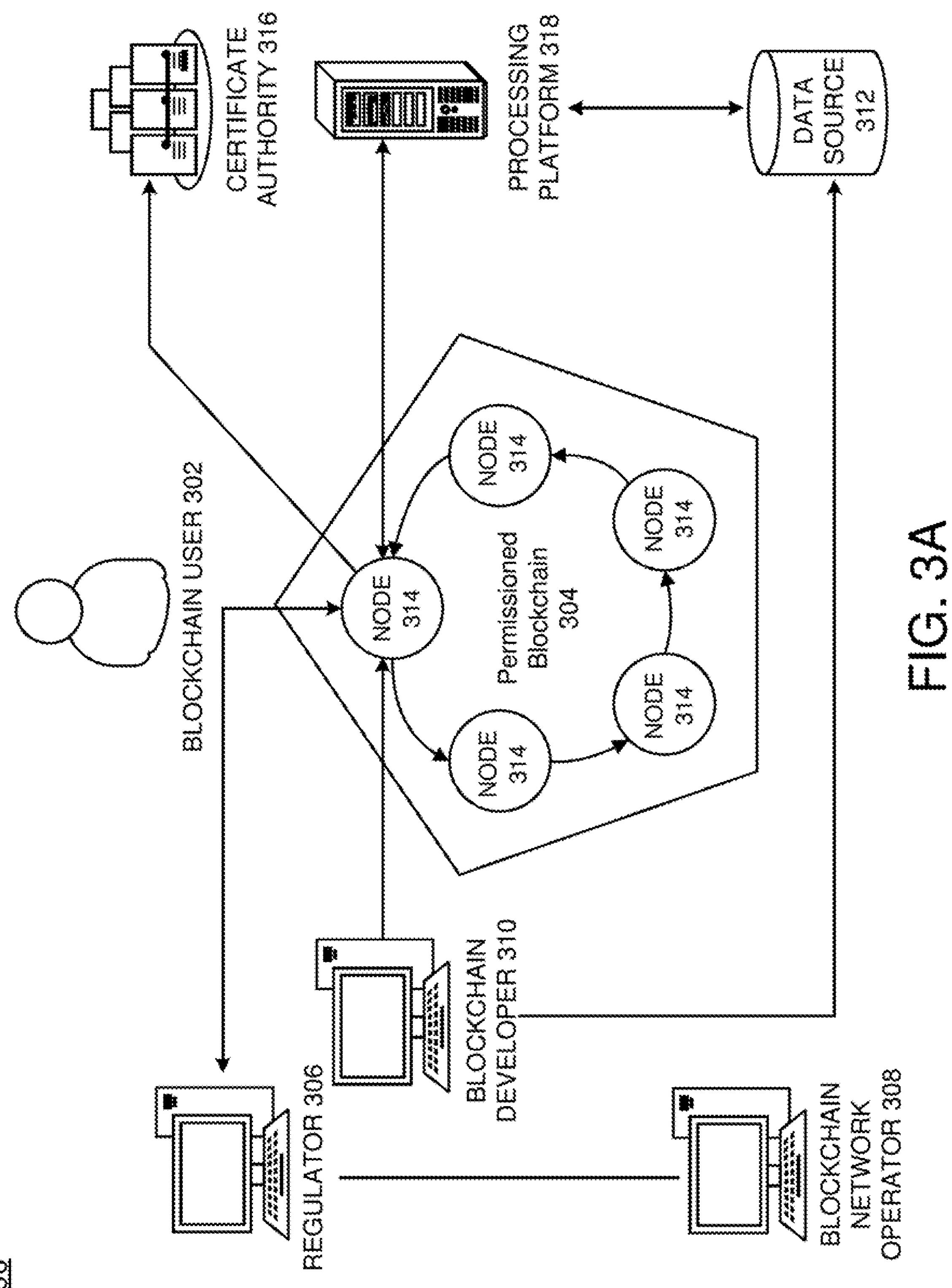
FIGS. 3A-3C are diagrams illustrating examples of a permissioned network according to example embodiments.

FIG. 3A illustrates an example of a permissioned blockchain network 300, which features a distributed, decentralized peer-to-peer architecture. The blockchain network may interact with the cloud computing environment 50, allowing additional functionality such as peer-to-peer authentication for data written to a distributed ledger. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
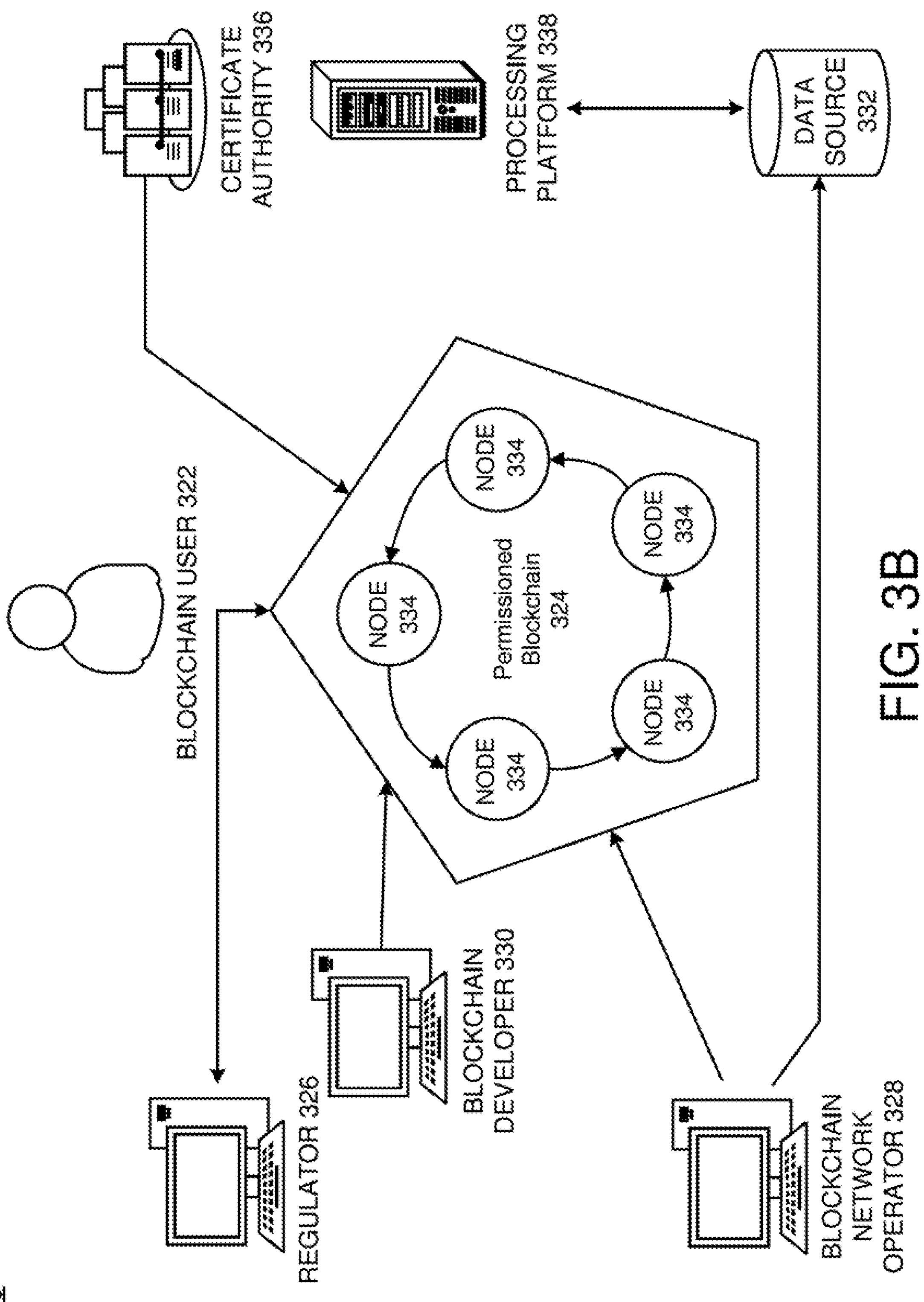

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains which require permission to join, anyone can join a permissionless blockchain. For example, to join a permissionless blockchain a user may create a personal address and begin interacting with the network, by submitting transactions, and hence adding entries to the ledger. Additionally, all parties have the choice of running a node on the system and employing the mining protocols to help verify transactions.

Figure 3C:
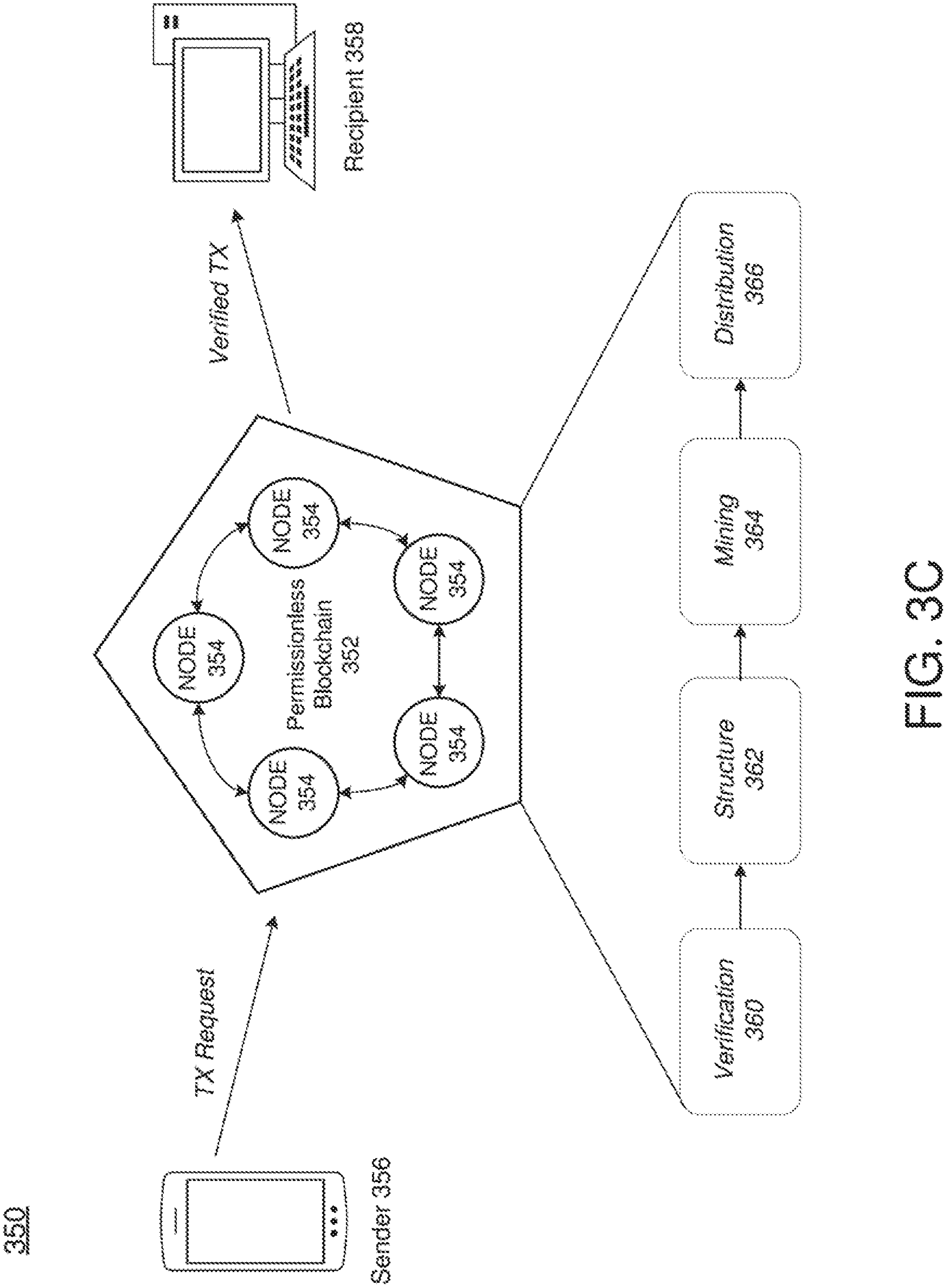

FIG. 3C illustrates a process 350 of a transaction being processed by a permissionless blockchain 352 including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters the nodes verify 360 the transaction based on rules (which may be pre-defined or dynamically allocated) established by the permissionless blockchain 352 creators. For example, this may include verifying identities of the parties involved, etc. The transaction may be verified immediately or it may be placed in a queue with other transactions and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256 bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution, the successfully validated block is distributed through the permissionless blockchain 352 and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

Figure 3D:
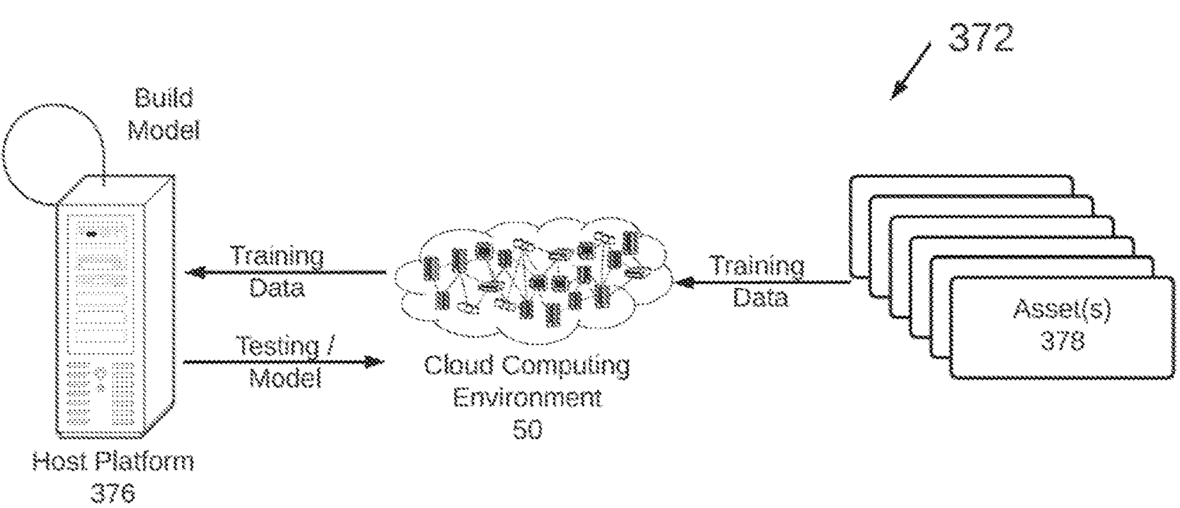
FIG. 3D is a diagram illustrating machine learning process via a cloud computing platform according to an example embodiment.
Figure 3D:
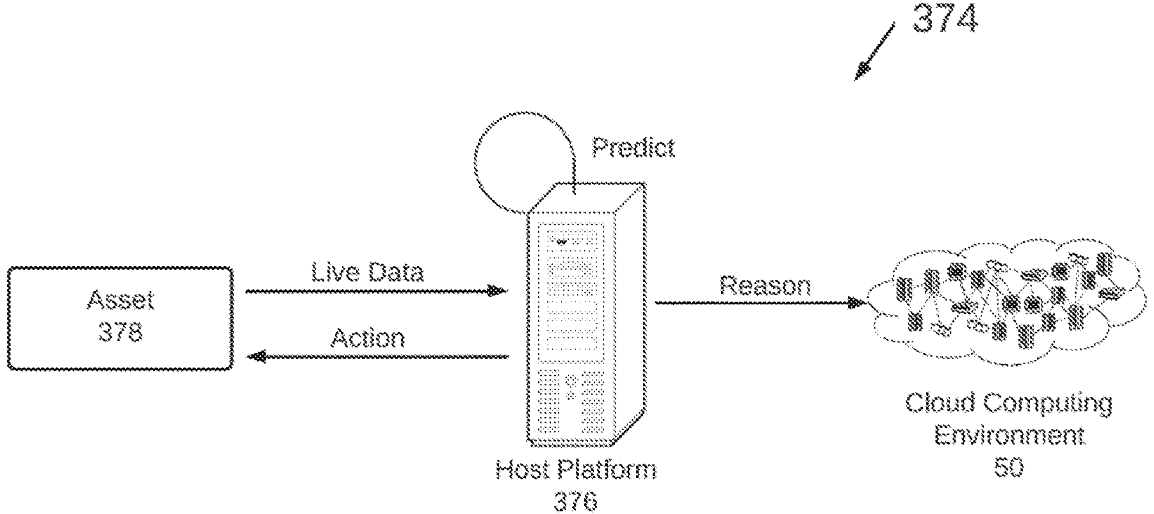
Figure 3E:
FIG. 3E is a diagram illustrating a quantum computing environment associated with a cloud computing platform according to an example embodiment.
Figure 3E:
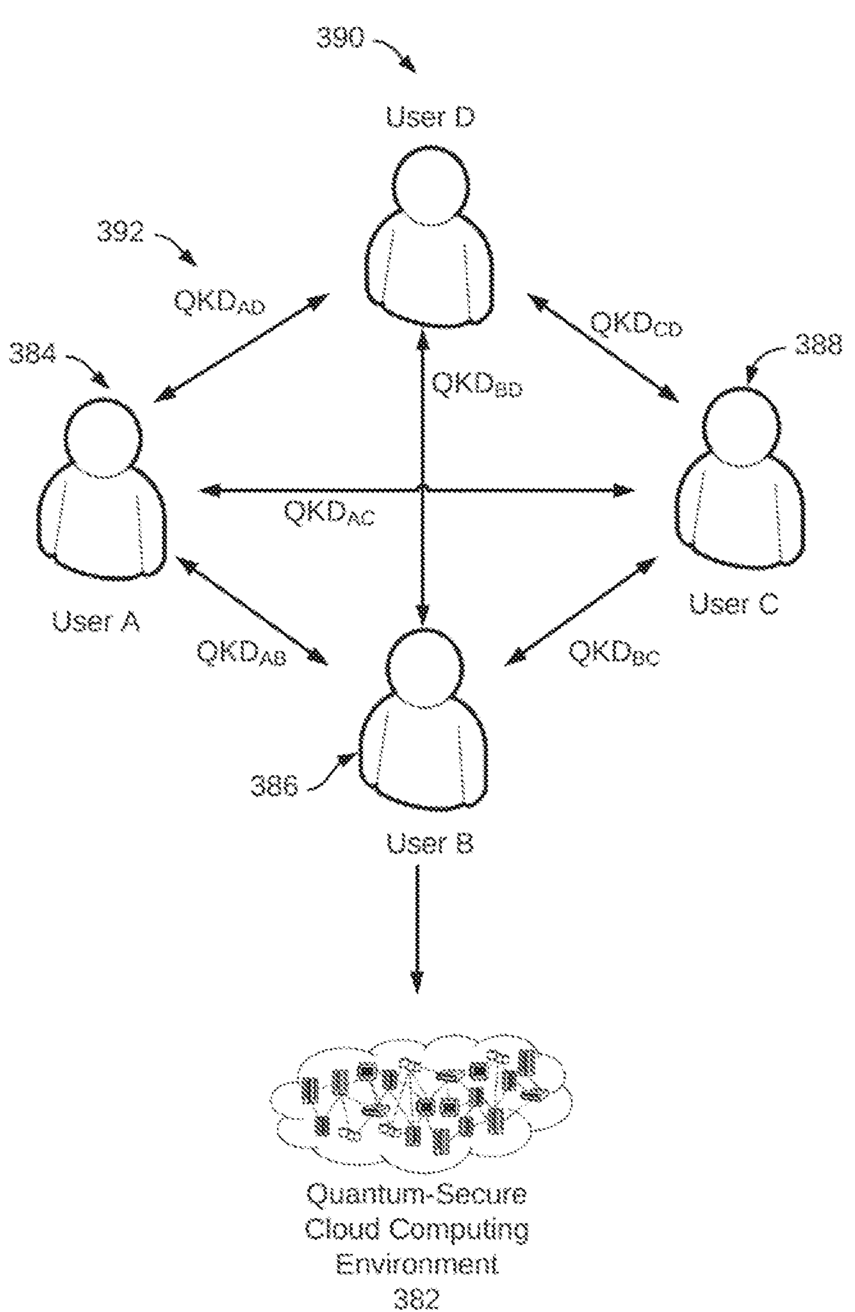

FIGS. 3D and 3E illustrate additional examples of use cases for cloud computing that may be incorporated and used herein. FIG. 3D illustrates an example 370 of a cloud computing environment 50 which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 3D, a host platform 376 builds and deploys a machine learning model for predictive monitoring of assets 378. Here, the host platform 366 may be a cloud platform, an industrial server, a web server, a personal computer, a user device, and the like. Assets 378 can be any type of asset (e.g., machine or equipment, etc.) such as an aircraft, locomotive, turbine, medical machinery and equipment, oil and gas equipment, boats, ships, vehicles, and the like. As another example, assets 378 may be non-tangible assets such as stocks, currency, digital coins, insurance, or the like.

The cloud computing environment 50 can be used to significantly improve both a training process 372 of the machine learning model and a predictive process 374 based on a trained machine learning model. For example, in 372, rather than requiring a data scientist/engineer or another user to collect the data, historical data may be stored by the assets 378 themselves (or through an intermediary, not shown) on the cloud computing environment 50. This can significantly reduce the collection time needed by the host platform 376 when performing predictive model training. For example, data can be directly and reliably transferred straight from its place of origin to the cloud computing environment 50. By using the cloud computing environment 50 to ensure the security and ownership of the collected data, smart contracts may directly send the data from the assets to the individuals that use the data for building a machine learning model. This allows for sharing of data among the assets 378.

Furthermore, training of the machine learning model on the collected data may take rounds of refinement and testing by the host platform 376. Each round may be based on additional data or data that was not previously considered to help expand the knowledge of the machine learning model. In 372, the different training and testing steps (and the data associated therewith) may be stored on the cloud computing environment 50 by the host platform 376. Each refinement of the machine learning model (e.g., changes in variables, weights, etc.) may be stored in the cloud computing environment 50 to provide verifiable proof of how the model was trained and what data was used to train the model. For example, the machine learning model may be stored on a blockchain to provide verifiable proof. Furthermore, when the host platform 376 has achieved a trained model, the resulting model may be stored on the cloud computing environment 50.

After the model has been trained, it may be deployed to a live environment where it can make predictions/decisions based on the execution of the final trained machine learning model. For example, in 374, the machine learning model may be used for condition-based maintenance (CBM) for an asset such as an aircraft, a wind turbine, a healthcare machine, and the like. In this example, data fed back from asset 378 may be input into the machine learning model and used to make event predictions such as failure events, error codes, and the like. Determinations made by the execution of the machine learning model at the host platform 376 may be stored on the cloud computing environment 50 to provide auditable/verifiable proof. As one non-limiting example, the machine learning model may predict a future breakdown/failure to a part of the asset 378 and create an alert or a notification to replace the part. The data behind this decision may be stored by the host platform 376 and/or on the cloud computing environment 50. In one embodiment the features and/or the actions described and/or depicted herein can occur on or with respect to the cloud computing environment 50.

FIG. 3E illustrates an example 380 of a quantum-secure cloud computing environment 382, which implements quantum key distribution (QKD) to protect against a quantum computing attack. In this example, cloud computing users can verify each other's identities using QKD. This sends information using quantum particles such as photons, which cannot be copied by an eavesdropper without destroying them. In this way, a sender, and a receiver through the cloud computing environment can be sure of each other's identity.

In the example of FIG. 3E, four users are present 384, 386, 388, and 390. Each pair of users may share a secret key 392 (i.e., a QKD) between themselves. Since there are four nodes in this example, six pairs of nodes exist, and therefore six different secret keys 392 are used including QKDAB, QKDAC, QKDAD, QKDBC, QKDBD, and QKDCD. Each pair can create a QKD by sending information using quantum particles such as photons, which cannot be copied by an eavesdropper without destroying them. In this way, a pair of users can be sure of each other's identity.

The operation of the cloud computing environment 382 is based on two procedures (i) creation of transactions, and (ii) construction of blocks that aggregate the new transactions. New transactions may be created similar to a traditional network, such as a blockchain network. Each transaction may contain information about a sender, a receiver, a time of creation, an amount (or value) to be transferred, a list of reference transactions that justifies the sender has funds for the operation, and the like. This transaction record is then sent to all other nodes where it is entered into a pool of unconfirmed transactions. Here, two parties (i.e., a pair of users from among 384-390) authenticate the transaction by providing their shared secret key 392 (QKD). This quantum signature can be attached to every transaction making it exceedingly difficult to be tampered with. Each node checks its entries with respect to a local copy of the cloud computing environment 382 to verify that each transaction has sufficient funds.

Conventional methods for training a time-series forecasting model involve three data subsets including a training subset, a validation subset, and a test subset. The training process involves iteratively executing the time-series forecasting model on the training subset until the model reaches a point where it can be validated. The training tries to optimize the parameters of the model (e.g., weights of a neural network, etc.) Meanwhile, hyperparameter optimization, also referred to herein as HPO, attempts to find a suitable set of hyperparameters that are generally not optimized during training.

Hyperparameters refer to configurations that are external to the machine-learning algorithm and have a value that cannot be estimated from the data (e.g., a number of hidden layer within a neural network, learning rate of a neural network, C and sigma parameters in support vector machines, the value of "k" in k-nearest neighbors algorithm, etc.) Conventional hyperparameter optimization for hierarchical time series forecaster training involves choosing a held-out validation time period from the data where the trained model's performance is evaluated and by optimizing that validation performance the hyperparameters of the model are selected. However, this process uses only the lowest-level of time-series for training and does not consider how upper-level time-series may affect the model. Meanwhile, in the example embodiments, a teacher model that is trained on upper-level time-series data may be used to optimize/modify the hyperparameters of a student model which is trained on the lowest-level time-series data.

FIG. 4A illustrates a hierarchical time-series data set 400 including four levels of data according to example embodiments. Referring to FIG. 4, the hierarchical time-series data set includes four levels of data include a highest level of data (level 1—root node 402), and a lowest level of data (level 4—leaf nodes 408). In addition, two intermediate upper levels between the lowest level (level 4) and the upper most level (level 1) also exist including a level 2 represented by node 404 and a level 3 represented by node 406.

The four levels of data starting with a root level (level 1) correspond to a sales quantity of all items within a jurisdictional denoted as the data value. In this example, the total sales of all items within the jurisdiction are 551 items broken down across two different regions (level 2) which are further broken down across four different stores (level 3) which are further broken down into 9 items at the four different stores (level 4). Each level above the lowest level includes another aggregation of data from a previous level. For example, level 2 data includes an aggregation of level 3 data, and level 3 data includes an aggregation of level 4 data, etc.

Figure 4B:
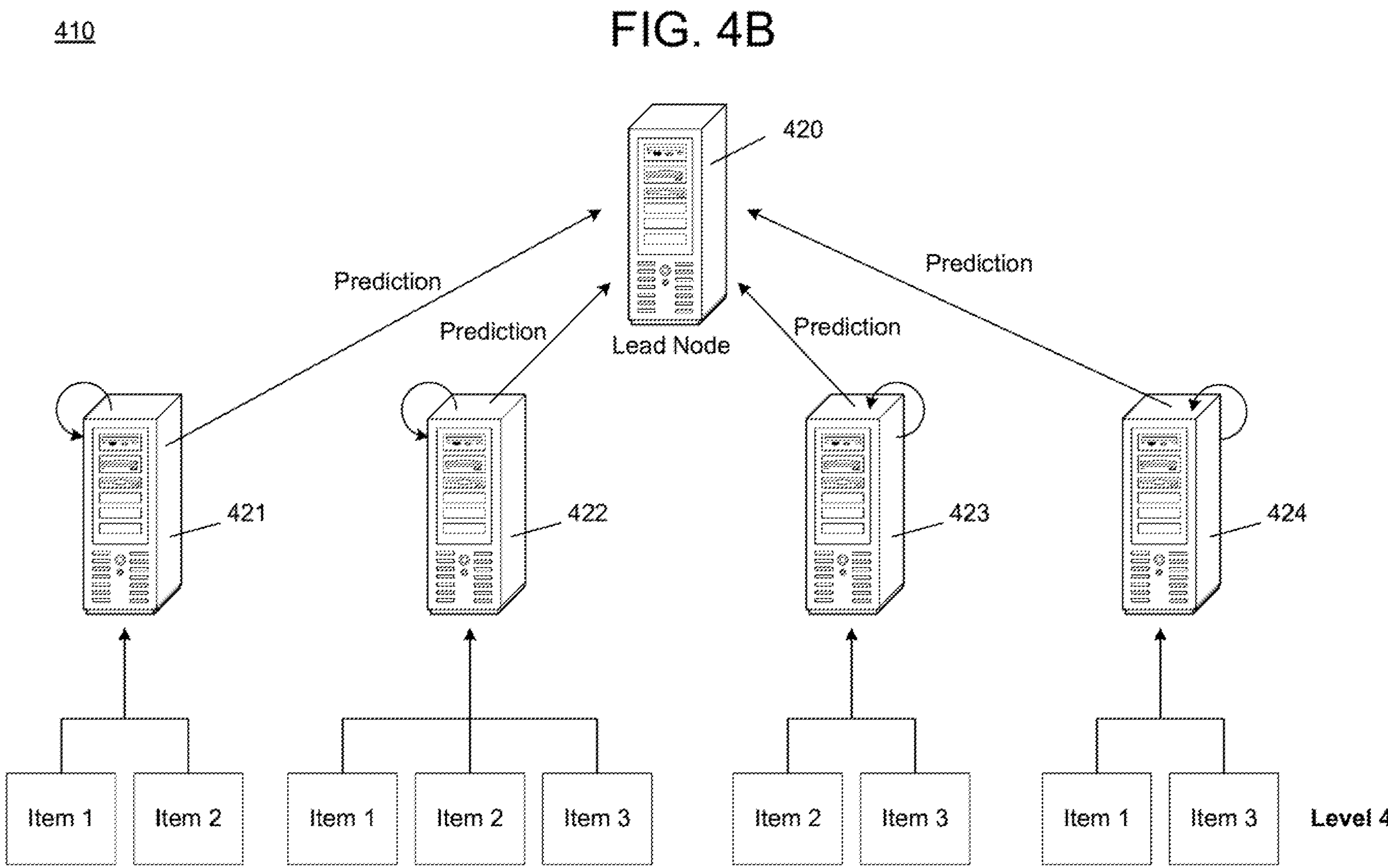
FIG. 4B is a diagram illustrating a process of training a time-series forecasting model based on lowest-level time-series data according to example embodiments.

FIG. 4B illustrates a process 410 of training a time-series forecasting model based on lowest-level time-series data according to example embodiments. In this example, five processing nodes (i.e., nodes 420, 421, 422, 423, and 424) are disposed within a cluster together. Here, some or all of the nodes 420, 421, 422, 423, 424, and 425 may have a time-series forecasting model deployed/installed therein and executed on minibatches of training data provided by a lead node from the cluster. Here, the node 420 is a lead node of the cluster and serves to distribute the training data to each of the other nodes 421-424 within the cluster.

In this example, the lead node 420 distributes the training data in subsets. Here, the lead node may divide the lowest level data from FIG. 4A (i.e., the data at level 4) and distribute different subsets of the lowest-level data to each of the other nodes 421-424 in the form of minibatches. The other nodes 421-424 may process their respective minibatches based on the time-series forecasting model to generated predicted outputs (training outputs). The predicted outputs can be sent to the lead node 420.

Figure 4C:
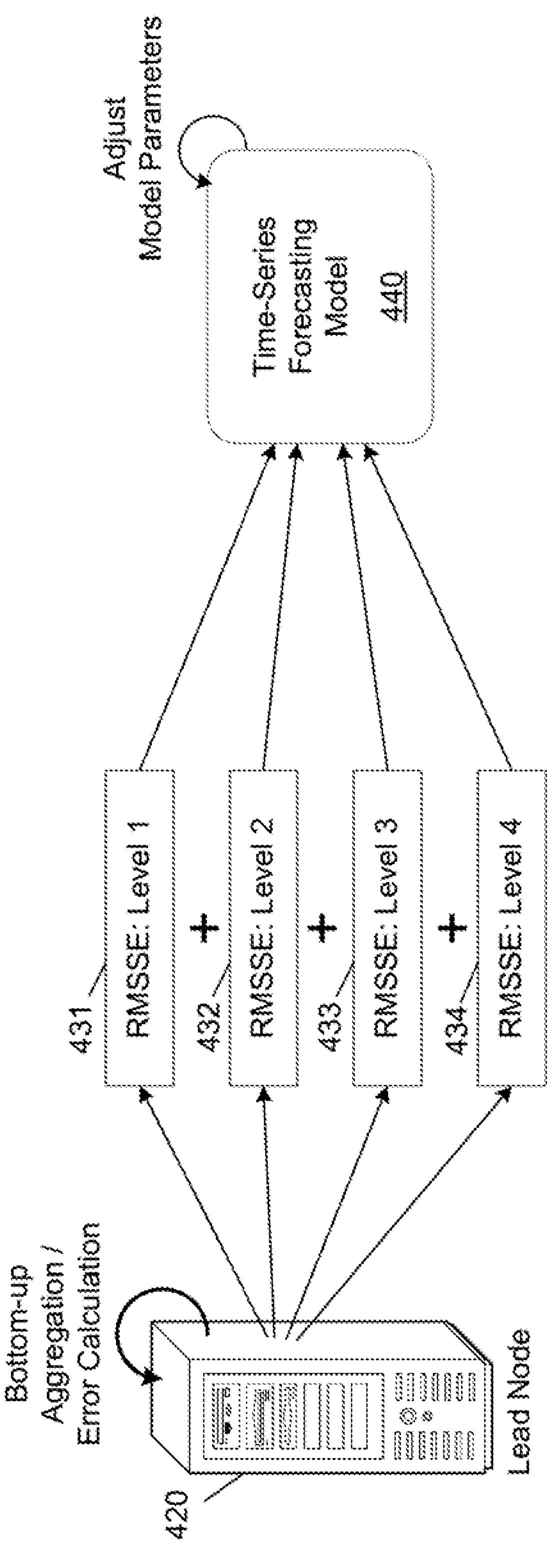
FIG. 4C is a diagram illustrating a process of bottom-up aggregation of error for all levels of the time-series data according to example embodiments.

FIG. 4C illustrates a process 430 of bottom-up aggregation of error for all levels of the time-series data according to example embodiments. Referring to FIG. 4C, the lead node 420 receives the predicted outputs of the other nodes 421-424 which are generated based on the lowest level (level 4) of the hierarchical time-series data set 400 in FIG. 4A. Next, the lead node 420 can perform a bottom-up aggregation on the predicted outputs from the lowest level to generated predicted outputs for one or more upper levels of the hierarchical time-series data set (e.g., levels 3, 2, and/or 1) without having to execute the time-series forecasting model on such data. Furthermore, the lead node 420 can compare the predicted outputs to known outputs at each level to derive a learning error, such as RMSSE, for the time-series forecasting model at each of the upper levels. In FIG. 4C, the lead node 420 derives an error value 431, 432, 433, and 434 for each of the levels of the hierarchical time-series data set 400 in FIG. 4A. The error can then be used to auto-tune one or more parameters of the timer-series forecasting model (e.g., time-series forecasting model 440 in FIG. 4C). The updates to the model can then be distributed to the other nodes 421-424 by the lead node 420 and a next iteration of the training process can be triggered by the lead node 420.

Figure 5:
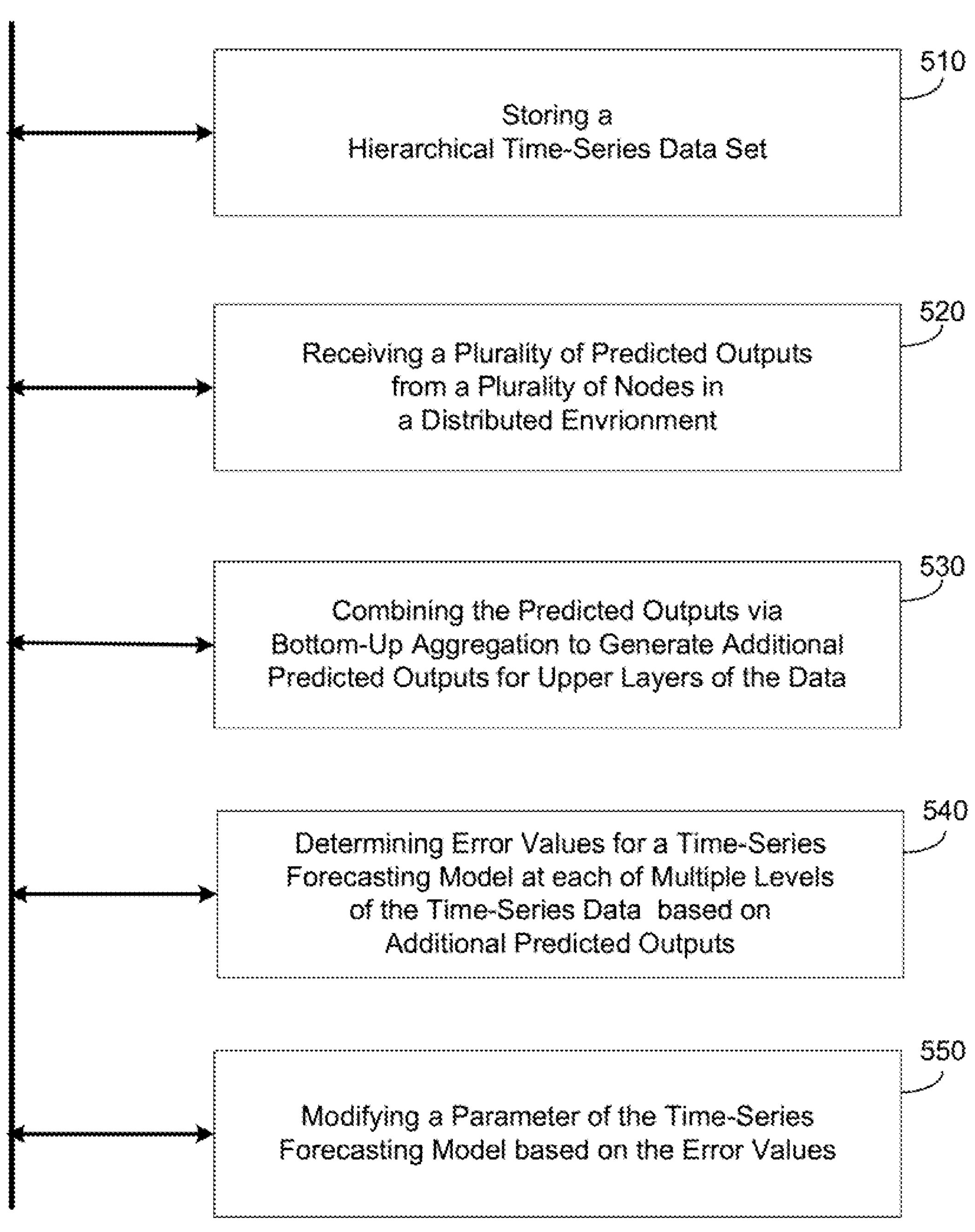
FIG. 5 is a diagram illustrating a method of training a time-series forecasting model according to an example embodiment.

FIG. 5 illustrates a method 500 of training a time-series forecasting model according to an example embodiment. For example, the method 500 may be performed by a computer system such as a cloud platform, a web server, a personal computer or other user device, and the like. Referring to FIG. 5, in 510 the method may include storing a hierarchical time-series data set. The hierarchical time-series data set may include a lowest level of data which is the sparsest set of data points. In addition, the hierarchical time-series data set may include one or more upper layers that are generated by rolling-up (aggregating) data from a layer below.

In 520, the method may include receiving a plurality of predicted outputs from a plurality of nodes in a distributed computing environment, respectively, wherein each predicted output is generated by a different node via execution of a time-series forecasting model on a different subset of data from a lowest level in the hierarchical time-series data set. In 530, the method may include combining the plurality of predicted outputs via bottom-up aggregation to generate one or more additional predicted outputs for the time-series forecasting model based on one or more levels above the lowest level in the hierarchical time-series data set. In 540, the method may include determining error values for the time-series forecasting model at each level among multiple levels of the hierarchical time-series data set based on the received plurality of predictive output and the one or more additional generated predicted outputs. In 550, the method may include modifying a parameter of the time-series forecasting model based on the determined error values.

In some embodiments, the method may further include randomly sampling the lowest level of the hierarchical time-series data set to generate a plurality of different subsets from the lowest level in the hierarchical time-series data set, and distributing the plurality of different subsets of the training data to the plurality of nodes. In some embodiments, the determining may include selecting an upper level within the hierarchical time-series data set and determining error values for the lowest level, the selected upper level, and any intermediate levels between the upper level and the lower level within the hierarchical time-series data set based on the one or more additional generated predicted outputs.

In some embodiments, the determining may include dynamically determining which upper level to select from among a plurality of upper levels within the hierarchical time-series data set based on one or more of a size of the hierarchical time-series data set, a type of the time-series forecasting model, and a number of nodes among the plurality of nodes. In some embodiments, the determining may include determining the error for the time-series forecasting model at each level based on a hierarchically aggregated RMSSE among the multiple levels of the hierarchical time-series data set.

In some embodiments, the method may further include broadcasting the modified parameter of the time-series forecasting model to the plurality of nodes. In some embodiments, the method may further include distributing a plurality of additional subsets of data from the lowest level of the hierarchical time-series data set to the plurality of nodes, respectively, and triggering a next iteration of training of the time-series forecasting model based on the modified parameter and the plurality of additional subsets of data.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 6:
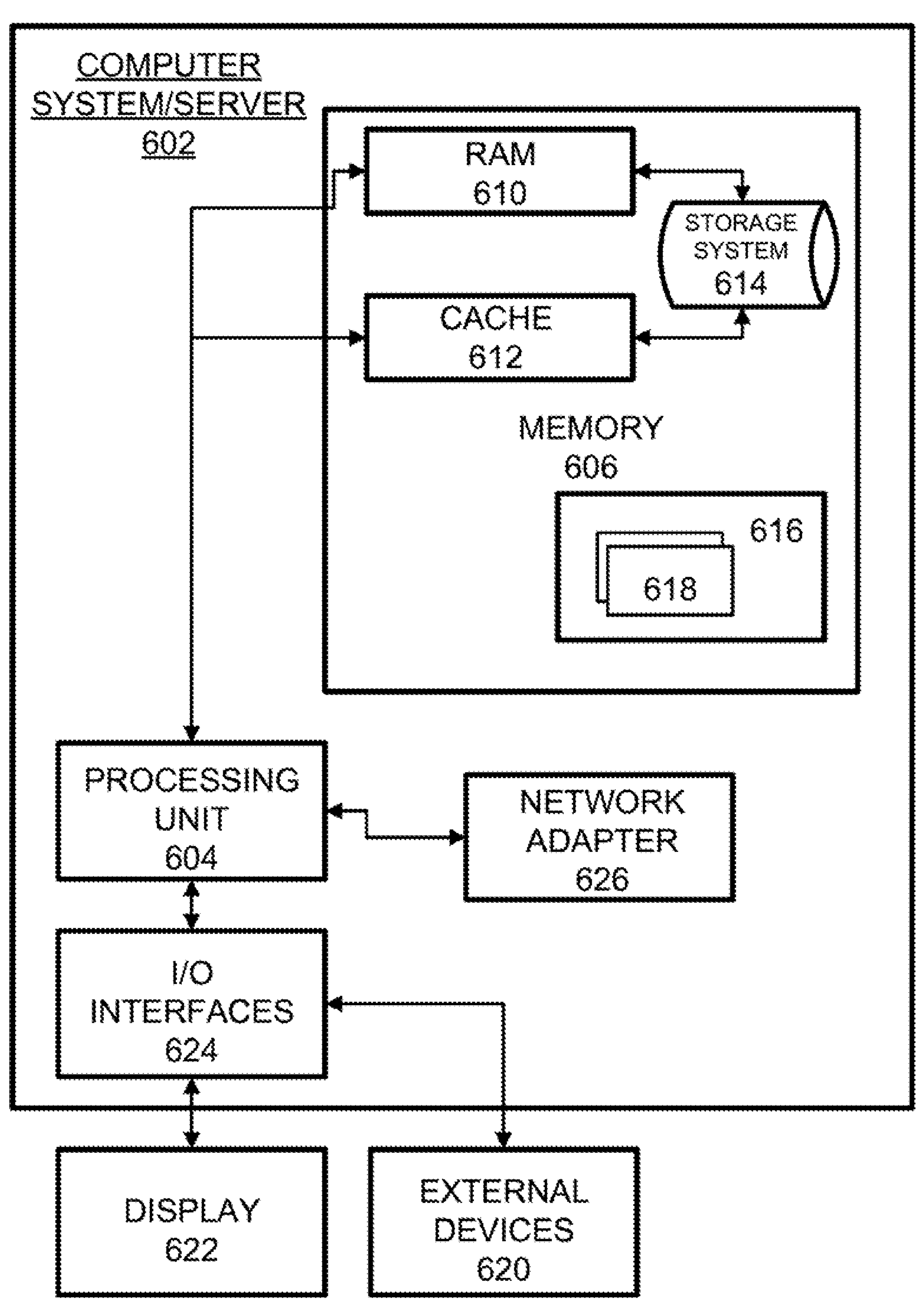
FIG. 6 is a diagram illustrating an example of a computing system that supports one or more of the example embodiments.

FIG. 6 illustrates an example system 600 that supports one or more of the example embodiments described and/or depicted herein. The system 600 comprises a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An apparatus comprising:

a memory configured to store a hierarchical time-series data set; and a processor configured to:

receive a plurality of predicted outputs from a plurality of nodes in a distributed computing environment, respectively, wherein each predicted output is generated by a different node via execution of a time-series forecasting model on a different subset of data from a lowest level of a plurality of levels of the hierarchical time-series data set;

combine the plurality of predicted outputs via bottom-up aggregation to generate one or more additional predicted outputs for the time-series forecasting model based on one or more levels of the plurality of levels above the lowest level in the hierarchical time-series data set;

determine error values for the time-series forecasting model at each level of the plurality of levels of the hierarchical time-series data set based on the received plurality of predictive outputs and the one or more additional generated predicted outputs;

calculate an aggregated error value via a combination of the determined error values at each level of the plurality of levels, wherein the determined error values are combined by assigning a respective weight to each level of the plurality of levels; and modify a parameter of the time-series forecasting model based at least in part on the aggregated error value.

2. The apparatus of claim 1, wherein the processor is configured to randomly sample the lowest level of the plurality of levels of the hierarchical time-series data set to generate a plurality of different subsets from the lowest level of the plurality of levels of the hierarchical time-series data set, and distribute the plurality of different subsets of training data to the plurality of nodes.

3. The apparatus of claim 1, wherein the processor is configured to select an upper level within the hierarchical time-series data set and determine error values for the lowest level of the plurality of levels of the hierarchical time-series data set, the selected upper level, and any intermediate levels within the hierarchical time-series data set based on the one or more additional generated predicted outputs.

4. The apparatus of claim 3, wherein the processor is configured to dynamically determine which upper level to select from among a plurality of upper levels within the hierarchical time-series data set based on one or more of a size of the hierarchical time-series data set, a type of the time-series forecasting model, and a number of nodes among the plurality of nodes.

5. The apparatus of claim 1, wherein the processor is configured to determine the error values for the time-series forecasting model at each level based on a hierarchically aggregated root mean squared error of estimation (RMSSE) corresponding to the plurality of levels of the hierarchical time-series data set.

6. The apparatus of claim 1, wherein the processor is further configured to broadcast the modified parameter of the time-series forecasting model to the plurality of nodes.

7. The apparatus of claim 1, wherein the processor is further configured to distribute a plurality of additional subsets of data from the lowest level of the plurality of levels of the hierarchical time-series data set to the plurality of nodes, respectively, and trigger a next iteration of training of the time-series forecasting model based on the modified parameter and the plurality of additional subsets of data.

8. A method comprising:

storing a hierarchical time-series data set;

receiving a plurality of predicted outputs from a plurality of nodes in a distributed computing environment, respectively, wherein each predicted output is generated by a different node via execution of a time-series forecasting model on a different subset of data from a lowest level of a plurality of levels of the hierarchical time-series data set;

combining the plurality of predicted outputs via bottom-up aggregation to generate one or more additional predicted outputs for the time-series forecasting model based on one or more levels of the plurality of levels above the lowest level of the plurality of levels of the hierarchical time-series data set;

determining error values for the time-series forecasting model at each level of the plurality of levels of the hierarchical time-series data set based on the received plurality of predictive output and the one or more additional generated predicted outputs;

calculating an aggregated error value by combining the determined error values for the plurality of levels, wherein the determined error values are combined by assigning a respective weight to each level of the plurality of levels; and modifying a parameter of the time-series forecasting model based at least in part on the aggregated error value.

9. The method of claim 8, wherein the method further comprises randomly sampling the lowest level of the plurality of levels of the hierarchical time-series data set to generate a plurality of different subsets from the lowest level of the plurality of levels of the hierarchical time-series data set, and distributing the plurality of different subsets of training data to the plurality of nodes.

10. The method of claim 8, wherein the determining comprises selecting an upper level within the hierarchical time-series data set and determining error values for the lowest level of the plurality of levels of the hierarchical time-series data, the selected upper level, and any intermediate levels between the upper level and the lowest level of the plurality of levels of the hierarchical time-series data within the hierarchical time-series data set based on the one or more additional generated predicted outputs.

11. The method of claim 10, wherein the determining comprises dynamically determining which upper level to select from among a plurality of upper levels within the hierarchical time-series data set based on one or more of a size of the hierarchical time-series data set, a type of the time-series forecasting model, and a number of nodes among the plurality of nodes.

12. The method of claim 8, wherein the determining comprises determining the error values for the time-series forecasting model at each level based on a hierarchically aggregated root mean squared error of estimation (RMSSE) corresponding to the plurality of levels of the hierarchical time-series data set.

13. The method of claim 8, wherein the method further comprises broadcasting the modified parameter of the time-series forecasting model to the plurality of nodes.

14. The method of claim 8, wherein the method further comprises distributing a plurality of additional subsets of data from the lowest level of the plurality of levels of the hierarchical time-series data set to the plurality of nodes, respectively, and triggering a next iteration of training of the time-series forecasting model based on the modified parameter and the plurality of additional subsets of data.

15. A non-transitory computer-readable storage medium storing a set of instructions for wireless communication, the set of instructions comprising:

one or more instructions that, when executed by one or more processors of a device, cause the device to:

store a hierarchical time-series data set;

receive a plurality of predicted outputs from a plurality of nodes in a distributed computing environment, respectively, wherein each predicted output is generated by a different node via execution of a time-series forecasting model on a different subset of data from a lowest level of a plurality of levels in the hierarchical time-series data set;

combine the plurality of predicted outputs via bottom-up aggregation to generate one or more additional predicted outputs for the time-series forecasting model based on one or more levels of the plurality of levels above the lowest level of the plurality of levels in the hierarchical time-series data set;

determine error values for the time-series forecasting model at each level of the plurality in levels of the hierarchical time-series data set based on the received plurality of predictive output and the one or more additional generated predicted outputs;

calculate an aggregated error value via a combination of the determined error values for the plurality of levels, wherein the determined error values are combined by assigning a respective weight to each level of the plurality of levels; and modify a parameter of the time-series forecasting model based at least in part on the aggregated error value.

16. The non-transitory computer-readable storage medium of claim 15, wherein the one or more instructions cause the device to:

randomly sample the lowest level of the plurality of levels in the hierarchical time-series data set to generate a plurality of different subsets from the lowest level of the plurality of levels in the hierarchical time-series data set, and distributing the plurality of different subsets of training data to the plurality of nodes.

17. The non-transitory computer-readable storage medium of claim 15, wherein the one or more instructions, to cause the device to determine the error values, cause the device to:

select an upper level within the hierarchical time-series data set and determining error values for the lowest level of the plurality of levels in the hierarchical time-series data set, the selected upper level, and any intermediate levels between the upper level and the lowest level of the plurality of levels in the hierarchical time-series data set within the hierarchical time-series data set based on the one or more additional generated predicted outputs.

18. The non-transitory computer-readable storage medium of claim 17, wherein the one or more instructions, to cause the device to determine the error values, cause the device to:

dynamically determine which upper level to select from among a plurality of upper levels within the hierarchical time-series data set based on one or more of a size of the hierarchical time-series data set, a type of the time-series forecasting model, and a number of nodes among the plurality of nodes.

19. The non-transitory computer-readable storage medium of claim 15, wherein the one or more instructions, to cause the device to determine the error values, cause the device to:

determine the error values for the time-series forecasting model at each level based on a hierarchically aggregated root mean squared error of estimation (RMSSE) corresponding to the plurality of levels in the hierarchical time-series data set.

20. The non-transitory computer-readable storage medium of claim 15, wherein the one or more instructions, cause the device to broadcast the modified parameter of the time-series forecasting model to the plurality of nodes.

* * * * *